Aug. 1, 1961    J. R. JOHNSON    2,994,352
APPARATUS FOR BARKING SLABS AND EDGINGS
Filed Sept. 15, 1959    3 Sheets-Sheet 2
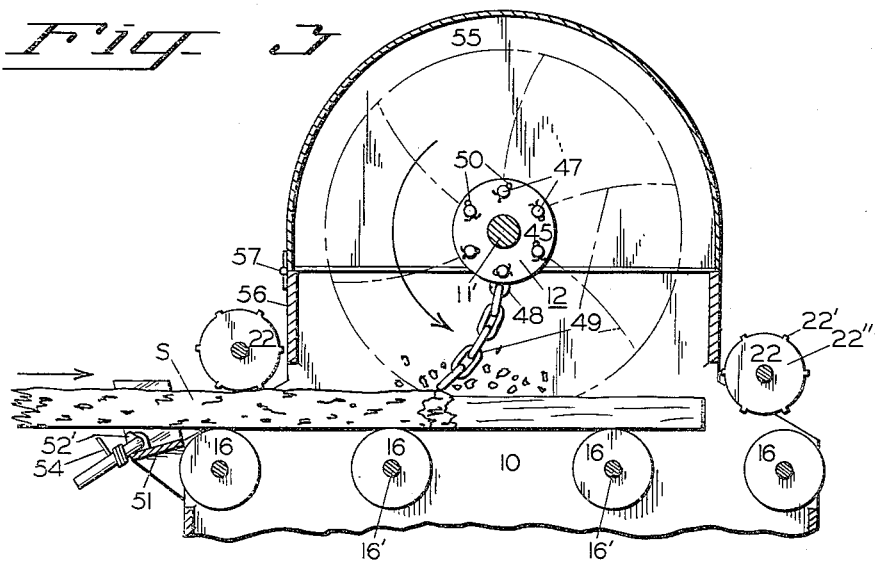
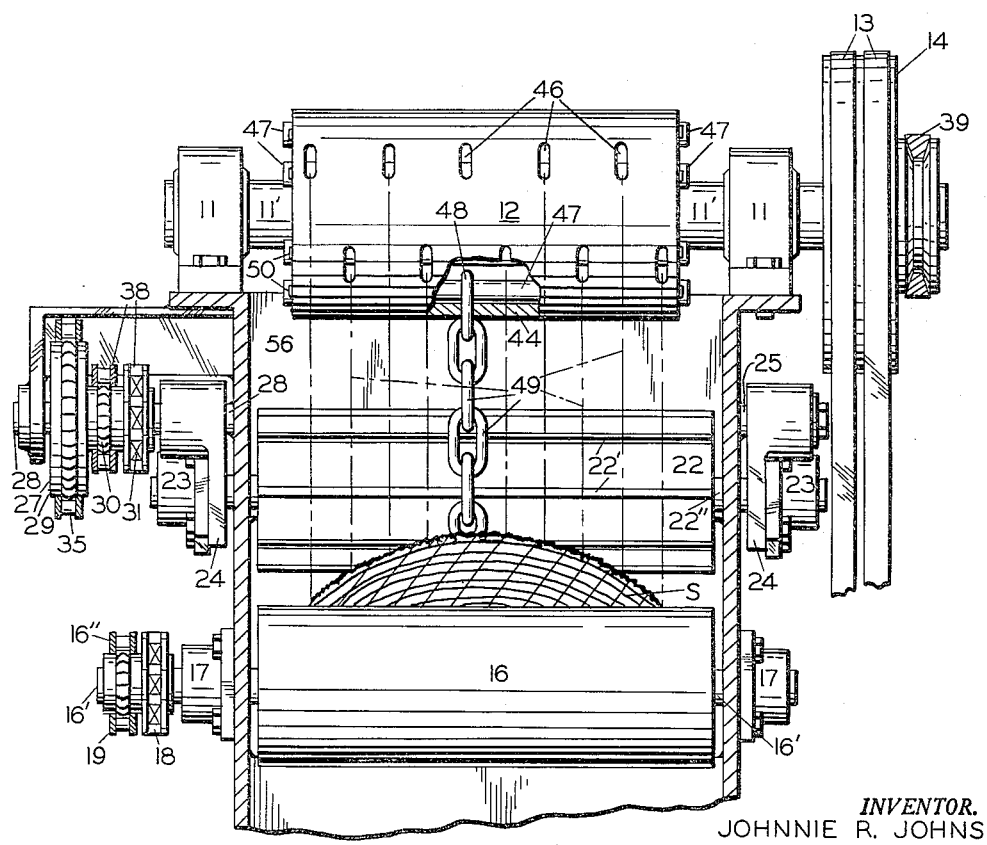
INVENTOR.
JOHNNIE R. JOHNSON
BY
Kimmel & Crowell
ATTORNEYS Aug. 1, 1961  J. R. JOHNSON  2,994,352
APPARATUS FOR BARKING SLABS AND EDGINGS
Filed Sept. 15, 1959  3 Sheets-Sheet 3

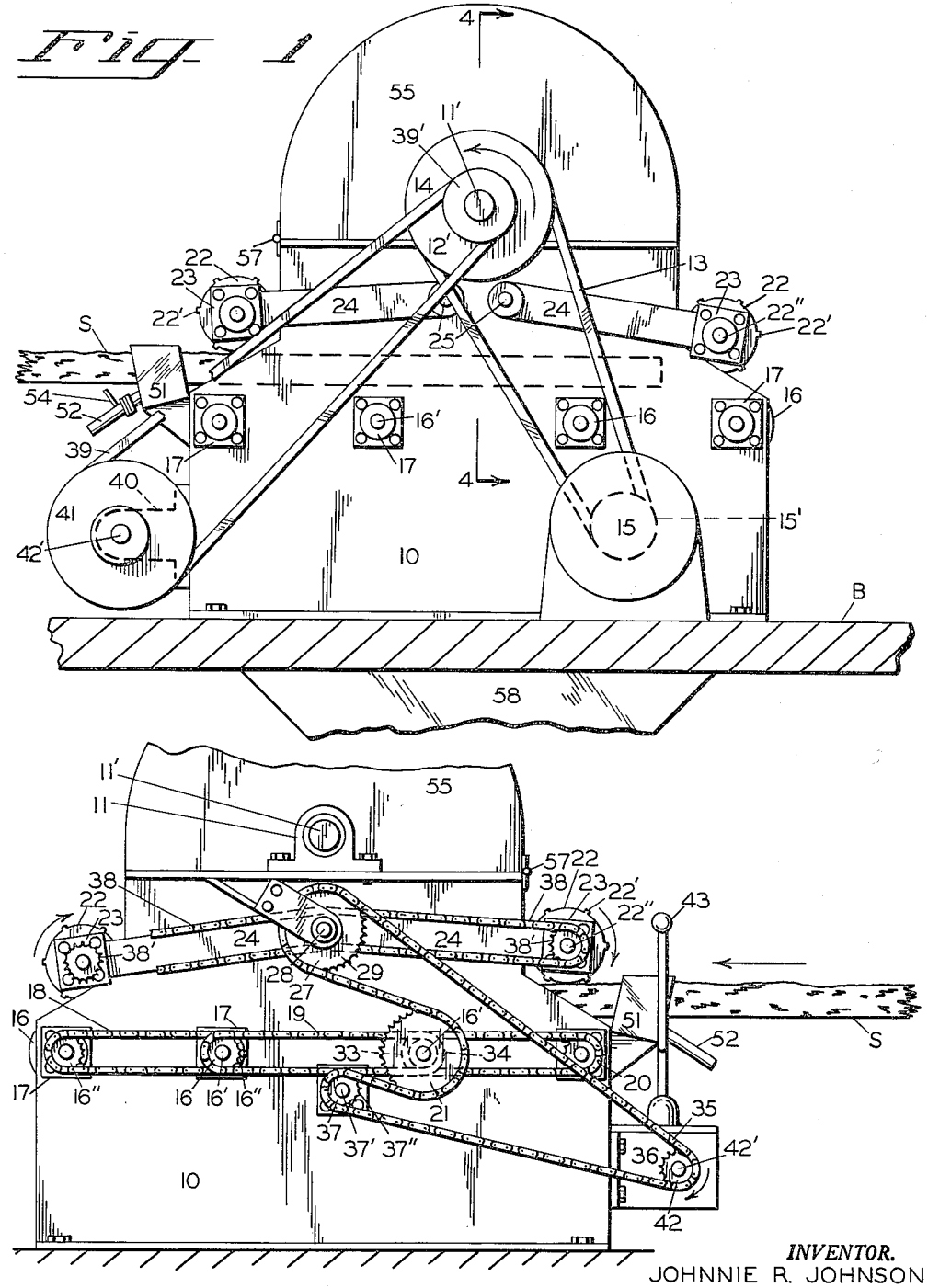

INVENTOR.
JOHNNIE R. JOHNSON
BY
Kimmel & Crowell
ATTORNEYS

United States Patent Office 2,994,352
Patented Aug. 1, 1961

2,994,352
APPARATUS FOR BARKING SLABS AND EDGINGS
Johnnie R. Johnson, Canby, Oreg.
(15315 SE. Harrison, Portland 33, Oreg.)
Filed Sept. 15, 1959, Ser. No. 840,146
1 Claim. (Cl. 144—208)

This invention relates to an apparatus for barking slabs and edgings, and has as its primary object the provision of an improved machine employing rotating flails or chains, particularly adapted for the barking of relatively thin strips of wood, such as slabs or edgings, in contrast to complete logs.

An additional object of the invention is the provision of such an apparatus which will remove the bark from a substantially long slab or edging in a single, continuous operation.

An additional object of the invention is the provision of such a device characterized by improved guide means for directing the edgings into the apparatus in a desired position, which guide means may be readily displaced in order to accommodate slabs in the same machine.

Still another object of the invention is the provision of such a device including a chain or flail assembly characterized by means whereby individual chains may be replaced with a minimum of effort and difficulty.

A still further object of the invention is the provision of such a device which is sturdy and durable in constrution, reliable and efficient in operation, and relatively simple and inexpensive to manufacture, assemble and utilize.

Still other objects reside in the combination of elements, arrangements of parts, and features of construction, all of which will be more fully pointed out hereinafter, and shown in the accompanying drawings, wherein:

FIGURE 1 is a side elevational view of one form of apparatus embodying elements of the instant invention;

FIGURE 2 is a view similar to FIGURE 1, partially broken away, taken from the opposite side of the device;

FIGURE 3 is a longitudinal sectional view taken substantially along the center line of the apparatus;

FIGURE 4 is a sectional view taken substantially along the line 4—4 of FIGURE 1, as viewed in the direction indicated by the arrows, on an enlarged scale;

Similar reference characters refer to similar parts throughout the several views of the drawings.

Figure 7:
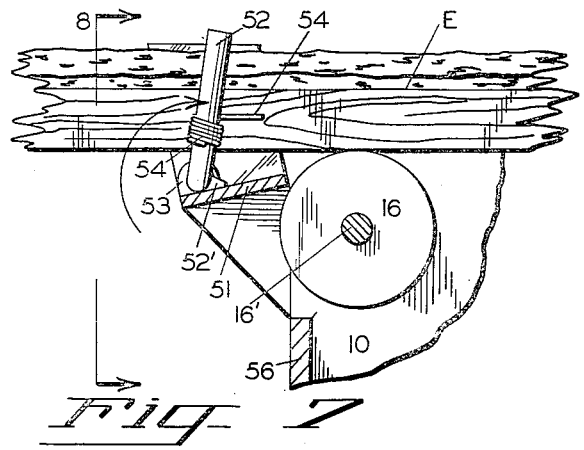
FIGURE 7 is an enlarged fragmentary sectional view illustrating an edging upon introduction to the apparatus through the guide means therefor.

Referring now to the drawings in detail, there is generally indicated at 10 a box-like supporting frame, on the upper portion of which are mounted bearing brackets 11 which rotatably support a shaft 11'.

The shaft 11' carries a rotor assembly 12, adapted for the barking of slabs or edgings, which assembly will be more fully described hereinafter.

The rotor assembly 12 is adapted to be rotated by means of a drive pulley 12' which comprises a portion of the sheave assembly 14. The assembly 14 is driven by a belt 13 from the drive pulley 15' of a suitable motor 15 which is mounted adjacent the frame 10 on the supporting base B for the assembly. The motor 15 may be of any desired conventional type, such as an electric motor, or suitable internal combustion engine, or the like.

A row of parallel supporting and feeding idler rollers 16 are mounted on shafts 16' carried by suitable journals 17 in the lower portion of the frame, and serve to support the slabs or edgings as they are fed through the machine. Each of the shafts 16' carries a sprocket 16" at one end, the sprocket 16" being interconnected by means of chains 18, 19 and 20 (see FIG. 2) has mounted thereon a drive sprocket 21, which is driven in a manner to be more fully described hereinafter.

Upper feed rollers 22 are also provided, and carry feeding knobs or knurls 22'. The rollers 22 are mounted on suitable shafts 22" carried by journals 23, which are mounted on the ends of guide and support arms 24.

The oppositely extending arms 24 at one end of the machine are mounted on suitable stub axles 25, and are adapted to move pivotally for the accommodation of inequalities in the thickness of the slab S or edging E being fed through the machine.

The arms 24 at the other end of the machine, as shown in FIGURE 2, are journalled on a single stub axle 28, which supports a multiple sprocket generally indicated at 27. The multiple sprocket 27 comprises a drive sprocket 29, and secondary sprockets 30 and 31. The sprockets 30 and 31 are connected by chains 38 to sprockets 38', which are carried by the shafts 22", for driving the upper rollers 22. The previously mentioned drive sprocket 21 on one of the shafts 16' is also associated with secondary sprockets 33 and 34, which drive respectively the chains 18, 19 and 20 for the rotation of the sprockets 16", and, consequently, the axle 16' and their associated lower feed rollers 16.

A chain 35 engages about the sprockets 21 and 29 for driving the same, and extends over an idler sprocket 37 which is mounted on a shaft 37' carried by a journal 37" mounted on the end of the frame 10. The chain 35 is, in turn, driven by a sprocket 42, which is carried by a shaft 42' which extends from the gear box 36, the latter being associated with and driven by the motor 15 in any desired conventional manner. A shift lever 43 controls the speed of drive of the shaft 42', and hence the chain 35 and the associated lower and upper rollers 16 and 22. This drive is effected by means of a belt 39, which is driven by a pulley 39' which is mounted on the shaft 11', the belt 39 engaging a pulley 41 which is mounted on the opposite end of the drive shaft 42'. A suitable supporting or mounting bracket 40 carries the end of the shaft 42' which carries the pulley 41.

Figure 6:
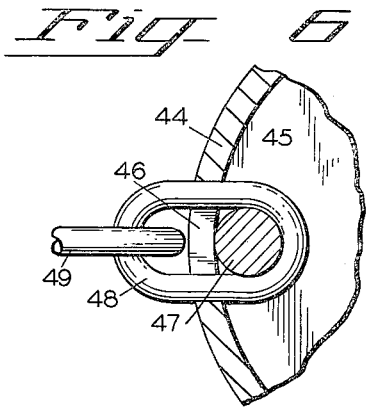
FIGURE 6 is an enlarged fragmentary sectional view of the rotor showing the means for securing the chains or flails thereto.
Figure 5:
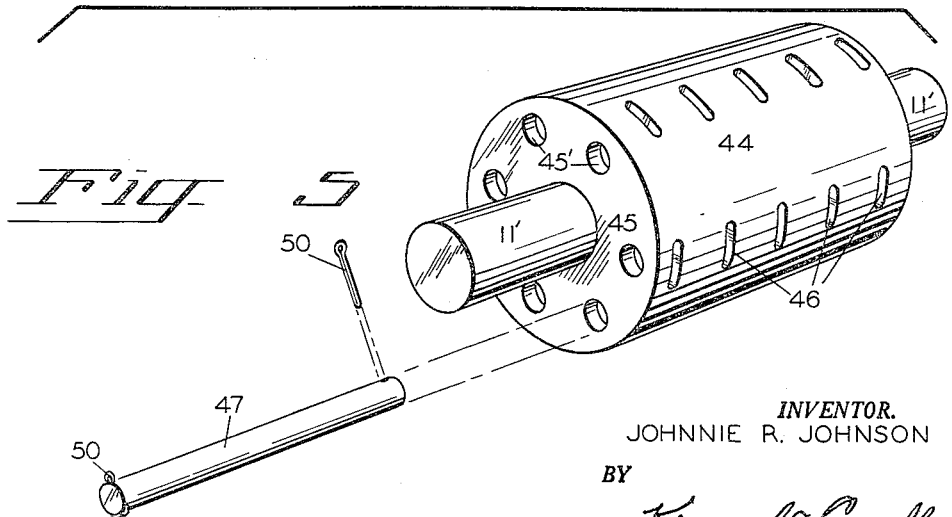
FIGURE 5 is an enlarged perspective end view of the barking rotor assembly, the chains being removed.

Referring back to the rotor or flail assembly 12, it will be seen that the same is comprised of a drum 44 of hollow cylindrical configuration, provided with end wall 45, apertured to receive the drive shaft 11' and provided with a series of radially disposed circular apertures 45'. The oppositely disposed apertures 45' are aligned longitudinally of the drum 45 each with a row of axially aligned peripherally offset apertures 46. Rods or shafts 47 are adapted to be extended through the openings 45' interiorally of the drum 44 to engage the end-most link 48 of a chain or plurality of chains 49, as best shown in FIGURES 4 and 6. Cotter pins 50 are engaged through suitable bores at each end of each shaft 47 for securing the shafts in related assembly with the drum 44, and may be removed to permit the removal of any single shaft 47 and the replacement of any end link 48 of a desired chain 49 thereon.

Figure 8:
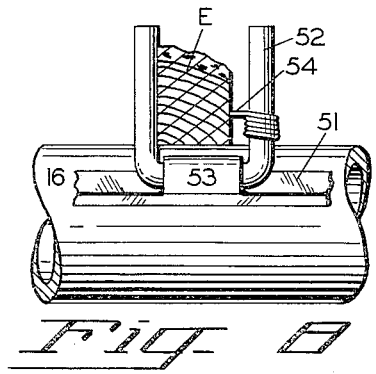
FIGURE 8 is a sectional view taken substantially along the line 8—8 of FIGURE 7 as viewed in the direction indicated by the arrows.
Figure 9:
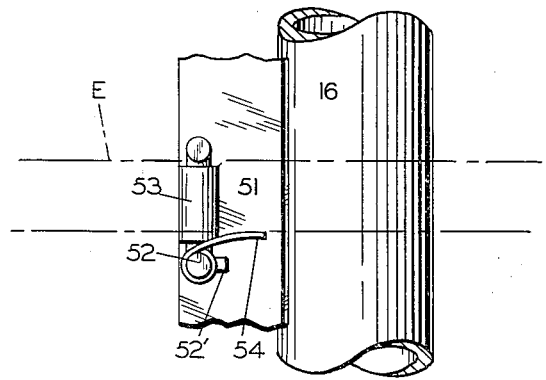
FIGURE 9 is a fragmentary plan view of the mechanism illustrated in FIGURE 7.

A guide lip 51 is positioned adjacent the intake side of the apparatus, and downwardly inclined to direct slabs between the rollers 16 and 22, as best shown in FIGURES 1 and 3. Suitable U-shaped edging guide members 52 are provided on the lip 51, and are pivotally mounted in brackets 53. When it is desired to feed edgings E through the device, as shown in FIGURES 7, 8 and 9, the fingers 52 are positioned upwardly, as shown, to accommodate the relatively thin edgings. Spring fingers 54 are provided to direct the edgings against one of the upright members 52 to hold the same firmly in upright position so that the bark thereon may be removed by the chains or flails 49. A stop member 52' is provided on each of the U-shaped members 52 in order to hold the fingers in upright positions. When slabs S are fed through the machine, the fingers 52 are rotated downwardly to the position shown in FIGURES 1 and 3, in order to permit the entrance of the relatively wide slabs S.

The apparatus is provided with a chain guard and cover member 55 which is hingedly mounted as at 57 to the upper frame members 56 of frame 10.

As best shown in FIGURE 1, the base B may be provided with a suitable central aperture beneath the frame 10, which communicates with a waste hopper 58 for the reception of bark or debris removed from the slabs, or edgings. The hopper 58 may empty into any suitable receptacle or conveyor (not shown) for removal of the waste products.

From the foregoing the use and operation of the device should now be readily understood. The motor 15 is energized and in turn drives the upper and lower feed rolls 22 and 16, and at the same time rotates the cylinder 44 and its associated chains or flails 49. With the guide members 52 in the position shown in FIGURE 1, slabs S may be fed through the machine, over the guide lip 51, and passing through the apparatus under the multiple flails 49 are completely debarked when they exit at the opposite end of the apparatus. When it is desired to remove the bark from edgings E, the guides 52 are moved into the position shown in FIGURES 7, 8 and 9 and the edgings run through in a similar manner. Since the operation of the device is continuous, the slabs may be fed thereto either manually or by any desired mechanical means, and the speed of passage therethrough governed by the adjustment of the clutch lever 43.

From the foregoing it will now be seen that there is herein provided an apparatus which accomplishes all of the objects of this invention, and others, including many advantages of great practical utility, and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

Apparatus for removing the bark from slabs and edgings comprising a frame, a plurality of lower guide and feed rollers mounted for rotation in said frame, upper guide and feed rollers rotatably mounted at opposite ends of said frame, a rotatable chain flail mounted in said frame above said upper rollers, a hinged hood for said flail, power means for simultaneousl rotation of said flail and said upper and lower rollers, said upper feed rollers being mounted on arms pivotally connected at their opposite ends to a mid-point on said frame, said power means including a motor mounted on said frame, a first shaft mounting said flail, a belt and pulley connection between said motor and said first shaft, a gear reduction box on said frame, a second belt and pulley connection between said first shaft and said gear box, a second shaft forming the pivotal connection of said arms, a first driven gear on said second shaft, a third shaft mounted in alignment with said lower rollers, a second driven gear on said third shaft, a drive gear driven from said gear reduction box, a single chain connection between said drive gear and said first and second driven gears, chain and gear connections between said second shaft and said upper guide and feed rollers, and additional chain and gear connections between said third shaft and all of said lower guide and feed rollers.

References Cited in the file of this patent
UNITED STATES PATENTS

| | | |
|---|---|---|
| 1,280,789 | McLennan | Oct. 8, 1918 |
| 1,956,653 | Onstad | May 1, 1934 |
| 2,578,516 | Crow | Dec. 11, 1951 |
| 2,699,804 | Starnes | Jan. 18, 1955 |
| 2,755,829 | Streed et al. | July 24, 1956 |
| 2,792,860 | Watkins | May 21, 1957 |